(12) United States Patent
Moon

(10) Patent No.: US 12,214,638 B2
(45) Date of Patent: Feb. 4, 2025

(54) VEHICULAR TORSION BEAM AXLE

(71) Applicant: HYUNDAI MOBIS CO., LTD., Seoul (KR)

(72) Inventor: Ka Ram Moon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/396,031

(22) Filed: Dec. 26, 2023

(65) Prior Publication Data

US 2024/0359517 A1 Oct. 31, 2024

(30) Foreign Application Priority Data

Apr. 27, 2023 (KR) .................. 10-2023-0055577

(51) Int. Cl.
*B60G 11/18* (2006.01)
*B60B 35/04* (2006.01)
*B60G 9/00* (2006.01)

(52) U.S. Cl.
CPC ............ *B60G 11/183* (2013.01); *B60B 35/04* (2013.01); *B60G 9/003* (2013.01); *B60G 2202/136* (2013.01); *B60G 2204/41* (2013.01)

(58) Field of Classification Search
CPC .............. B60G 11/183; B60G 11/20; B60G 2202/136; B60G 2204/41; B60G 21/0551; B60G 2202/135; B60G 2206/427; B60G 2204/1226; B60G 2204/44; B60B 35/04; F16F 1/3814; Y10T 403/458

See application file for complete search history.

(56) References Cited

U.S. PATENT DOCUMENTS

2005/0082904 A1 * 4/2005 Kang ..................... B60B 35/04
301/127

FOREIGN PATENT DOCUMENTS

| FR | 2292153 A1 | * | 6/1976 | ................ F16F 1/38 |
| KR | 100256446 B1 | * | 5/2000 | ................ F16F 1/36 |
| KR | 101122974 B1 | * | 3/2012 | ............. B60G 7/001 |
| KR | 20220152741 A | * | 11/2022 | ......... B60G 21/0551 |

OTHER PUBLICATIONS

Kwon, Low Arm Bush Attaching Device for Car, May 15, 2000, KIPRIS, KR 100256446 B1, Machine Translation of Description (Year: 2000).*

* cited by examiner

*Primary Examiner* — Paul N Dickson
*Assistant Examiner* — Matthew D Lee
(74) *Attorney, Agent, or Firm* — Novo TechIP International PLLC

(57) ABSTRACT

A vehicular torsion beam axle includes a torsion beam, a pair of trailing arms connected to both ends, respectively, of the torsion beam; a pair of mounting pipes connected to the pair of trailing arms, respectively, each of the mounting pipes including a separation prevention protrusion, and a bushing press-inserted into each of the mounting pipes. Each of the bushings has a separation prevention groove in which the separation prevention protrusion of one of the mounting pipes is engaged.

9 Claims, 12 Drawing Sheets

VEHICULAR TORSION BEAM AXLE

CROSS-REFERENCE TO RELATED APPLICATIONS

This application claims the benefit under 35 U.S.C. § 119(a) of priority to Korean Patent Application No. 10-2023-0055577, filed on Apr. 27, 2023, in the Korean Intellectual Property Office, the entire disclosure of which is incorporated herein by reference for all purposes.

TECHNICAL FIELD

Exemplary embodiments of the present disclosure relate to a vehicular torsion beam axle, and more particularly, to a vehicular torsion beam axle capable of preventing a bushing from being separated from a mounting pipe during vehicle traveling.

BACKGROUND

Usually, a torsion beam axle is connected to wheels of a vehicle. The torsion beam axle includes a mounting pipe coupled to a trailing arm. In this case, a bushing is press-inserted into the mounting pipe. In this case, in order to reduce the weight of the bushing, an outer pipe of the bushing is formed of plastic material. However, a problem arises in that the bushing is separated from the mounting pipe during vehicle traveling due to a decrease in force with which the mounting pipe and the outer pipe are coupled. Therefore, there is a need to alleviate this problem.

SUMMARY

Various embodiments, which address the above-mentioned need, are directed to a vehicular bushing apparatus capable of preventing a bushing from being separated from a mounting pipe during vehicle traveling.

In order to accomplish the above-mentioned object, in an embodiment, a vehicular torsion beam axle includes: a torsion beam; a pair of trailing arms connected to both sides, respectively, of the torsion beam; a pair of mounting pipes, each including a separation prevention protrusion, the pair of mounting pipes being respectively connected to the pair of torsion beams; and a bushing press-inserted into the mounting pipe, the bushing having a separation prevention groove with which the separation prevention protrusion is engaged.

The bushing may include: an outer pipe, the separation prevention groove being formed in the outer pipe; an inner pipe arranged inside the outer pipe; and an elastic member formed of elastic material, the elastic member being positioned between the outer pipe and the inner pipe.

The vehicular torsion beam axle, the mounting pipe may include: a mounting pipe main body, the outer pipe being press-inserted into the mounting pipe main body; and the separation prevention protrusion formed to protrude inward from an inner circumferential surface of the mounting pipe main body, the separation prevention protrusion being engaged with the separation prevention groove.

A plurality of the separation prevention protrusions may be arranged on the inner circumferential surface of the mounting pipe main body in such a manner as to be spaced apart from each other.

The separation prevention protrusion may have a rounded shape.

The outer pipe may include: an outer pipe main body having the separation prevention groove formed in an outer circumferential surface thereof in a circumferential direction thereof, a plurality of the separation prevention protrusions being engaged with the separation prevention groove and an elastic deformation groove formed in a manner that intersects the separation prevention groove; and a pair of outer pipe protrusions formed to extend outward from both ends, respectively, of the outer pipe main body, the mounting pipe being arranged between the pair of outer pipe protrusions.

A first chamfer may be formed on the separation prevention groove.

A second chamfer may be formed on at least one of the pair of outer pipe protrusions.

The second chamfer may be formed on an outer circumferential surface of the at least one of the pair of outer pipe protrusions in an inclined manner.

The elastic deformation groove may elastically deform the elastic member when the bushing is inserted into the mounting pipe.

The mounting pipe is primarily coupled between the outer pipe protrusions on the bushing and the separation prevention protrusion on the mounting pipe is secondarily engaged with the separation prevention groove in the bushing. Thus, during vehicle traveling, the bushing can be prevented from being separated from the mounting pipe.

According to the present disclosure, since the first chamfer is formed on the separation prevention groove, the separation prevention protrusion can be readily engaged with the separation prevention groove.

According to the present disclosure, since the second chamfer is formed on at least one of both ends of the outer pipe, the smooth insertion of the bushing into the mounting pipe can be facilitated.

DETAILED DESCRIPTION

Figure 1:
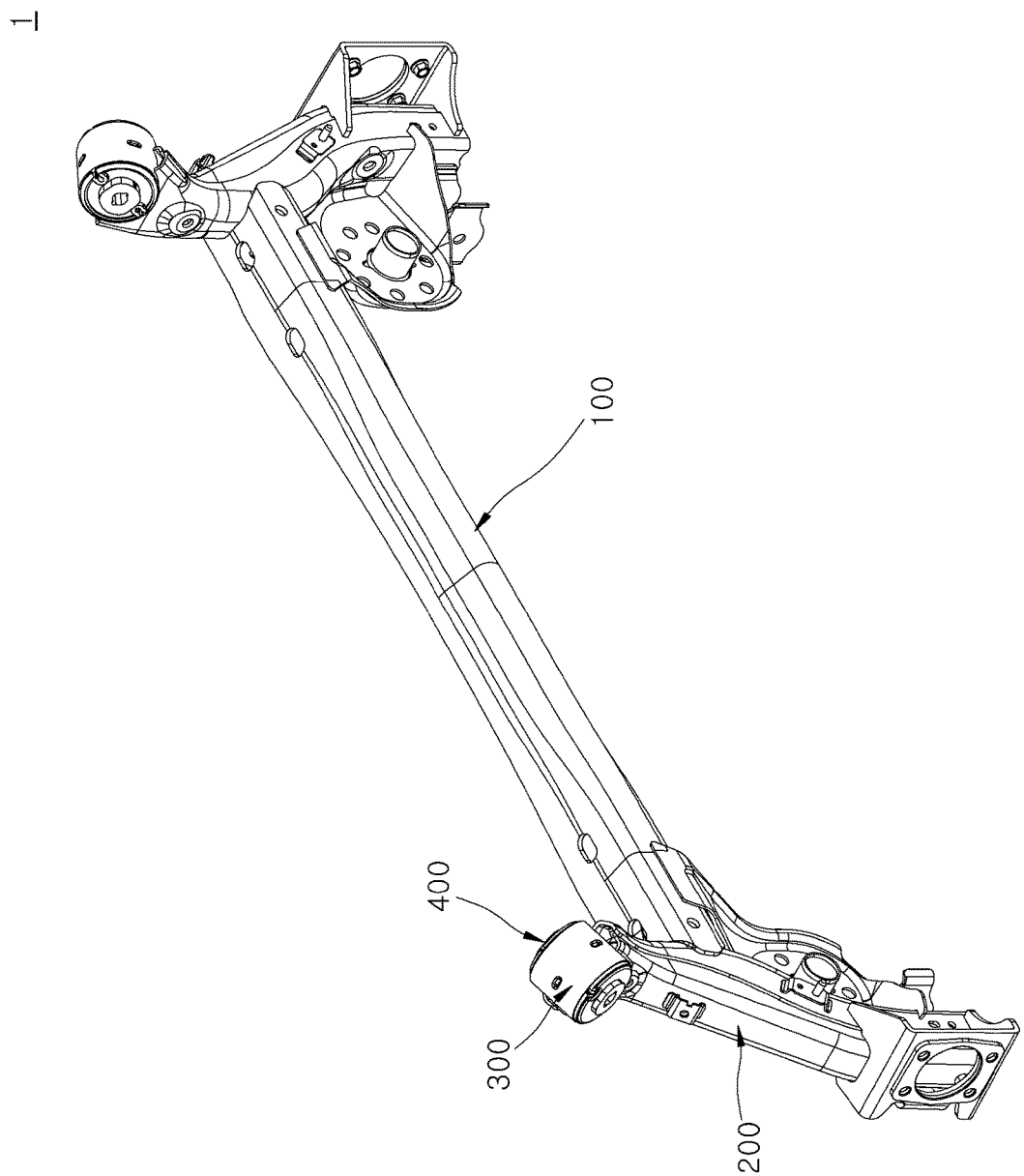
FIG. 1 is a view schematically illustrating a vehicular torsion beam axle according to an embodiment of the present disclosure.

A vehicular torsion beam axle according to an embodiment of the present disclosure will be described below with reference to the accompanying drawing.

For clarity and convenience in description, thicknesses of lines, sizes of constituent elements, and the like may be illustrated in a non-exact proportion in the drawings. In addition, terms that hereinafter refer to constituent elements, respectively, according to the present disclosure are defined by considering their respective functions and may vary according to a user's or manager's intention or to practices in the art. Therefore, these terms should be contextually defined in light of the present specification.

Figure 2:
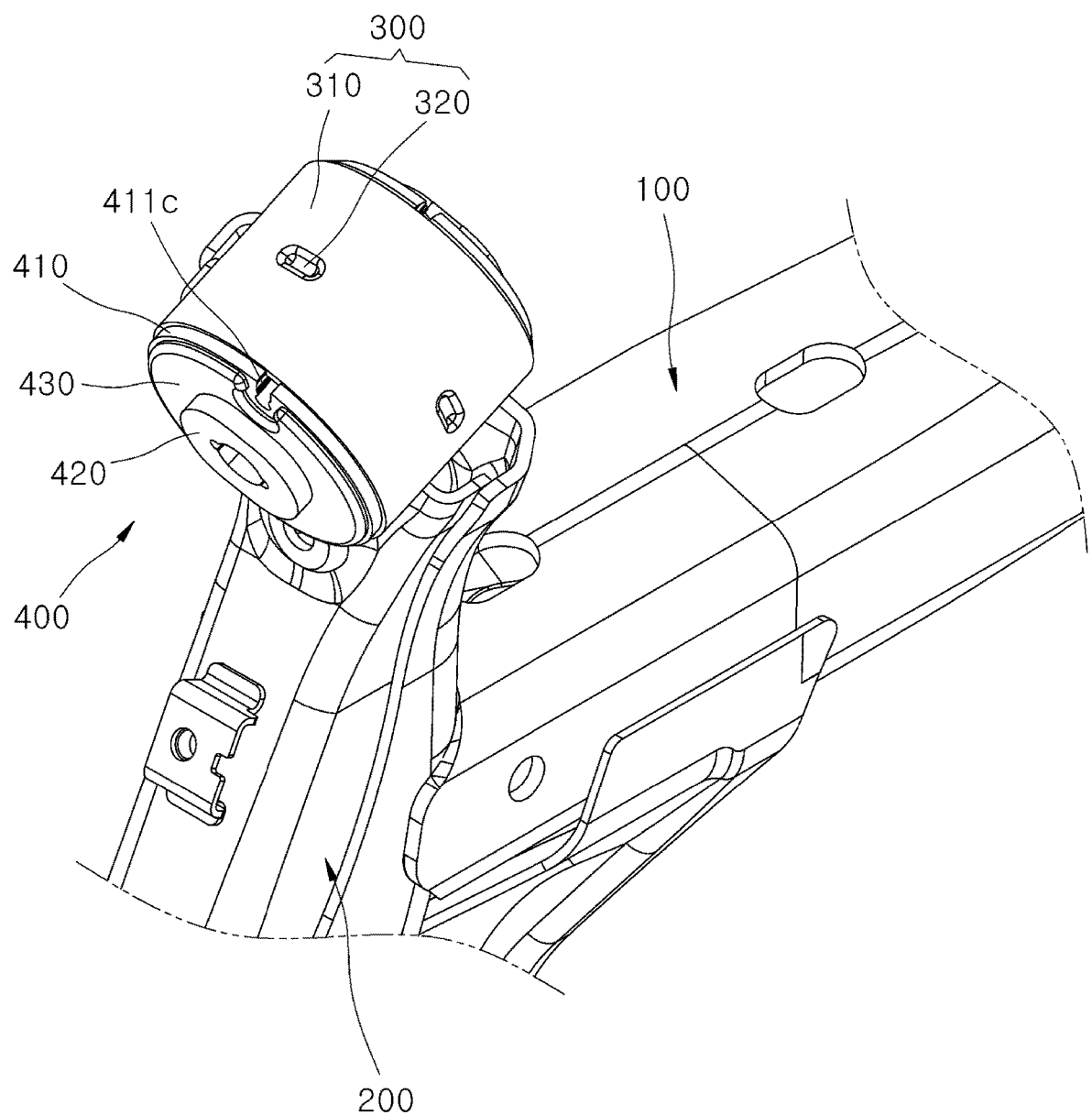
FIG. 2 is a perspective view illustrating essential components of the vehicular torsion beam axle according to the embodiment of the present disclosure.
Figure 3:
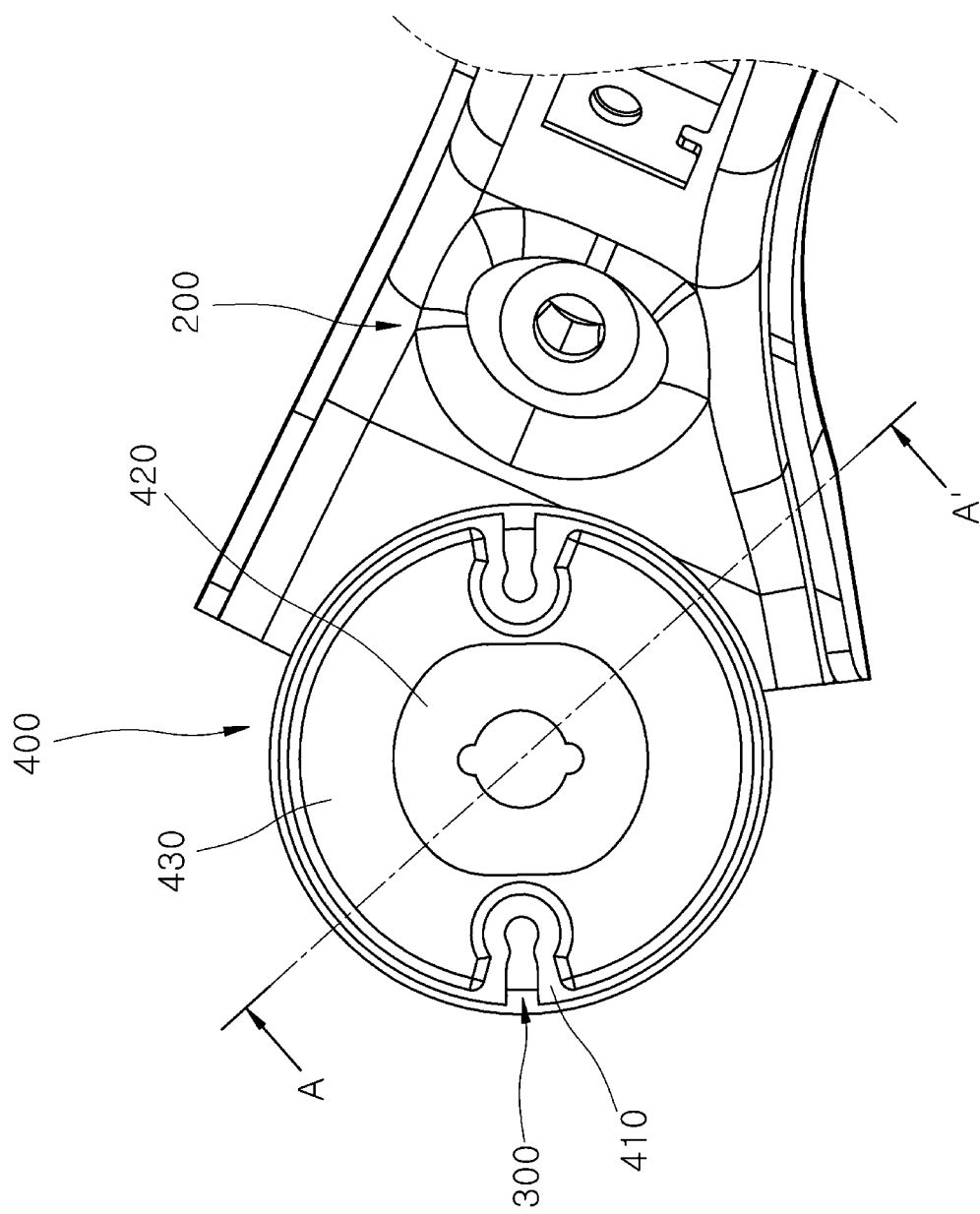
FIG. 3 is a top view illustrating the essential components of the vehicular torsion beam axle according to the embodiment of the present disclosure in FIG. 2.
Figure 4:
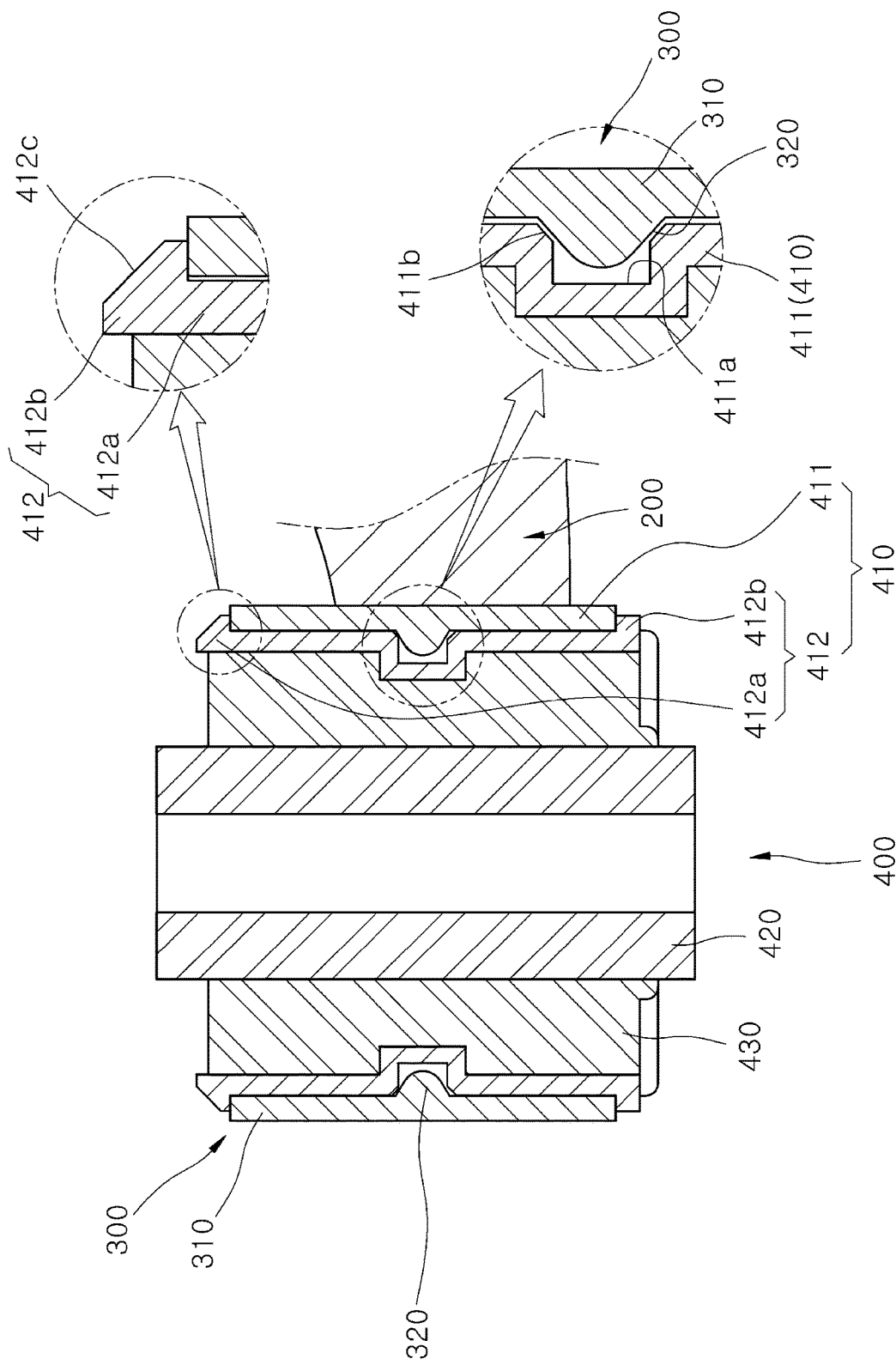
FIG. 4 is a cross-sectional view taken along line A-A' on FIG. 2.
Figure 5:
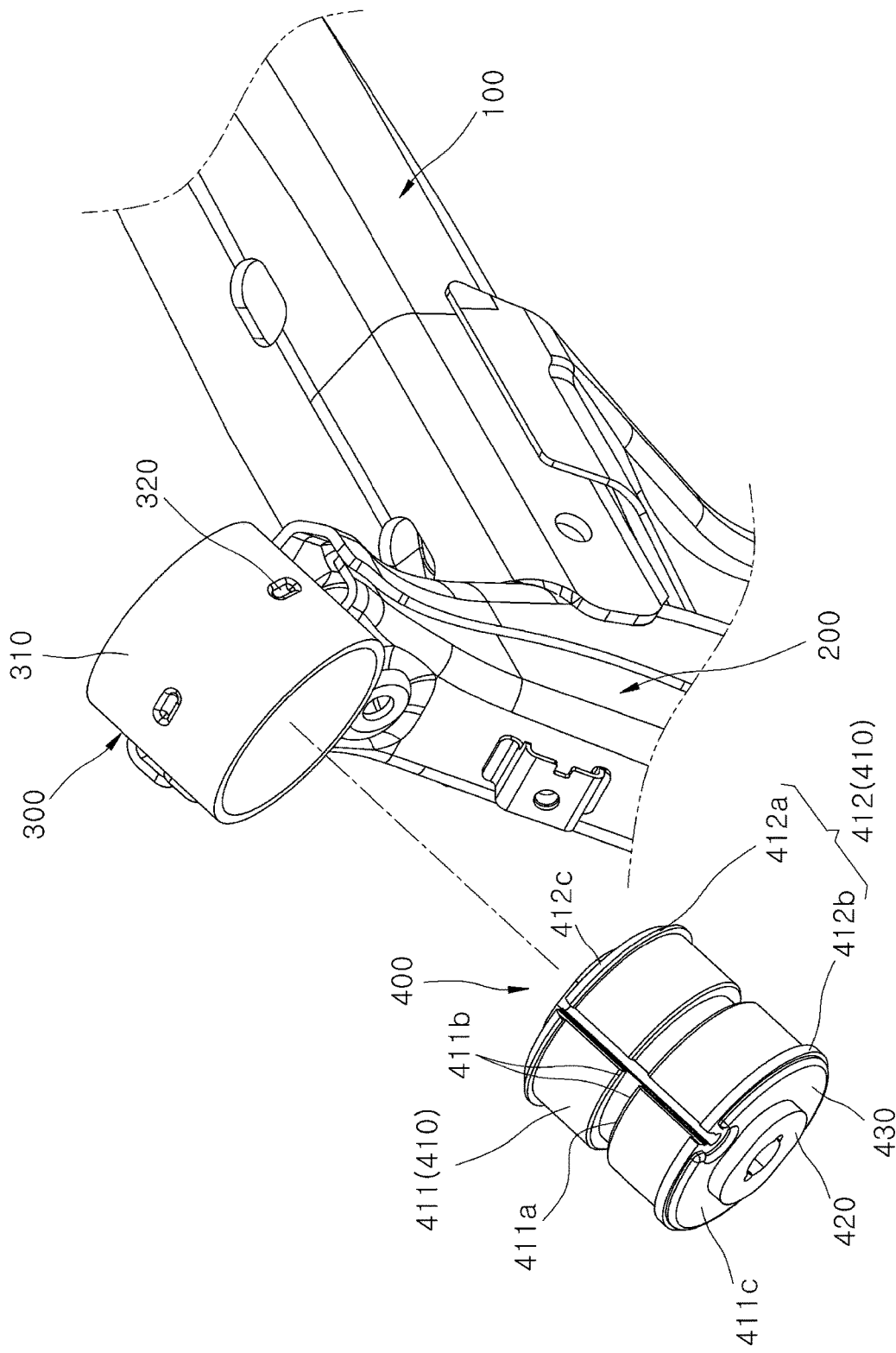
FIG. 5 is an exploded perspective view illustrating the essential components of the vehicular torsion beam axle according to the embodiment of the present disclosure.
Figure 6A:
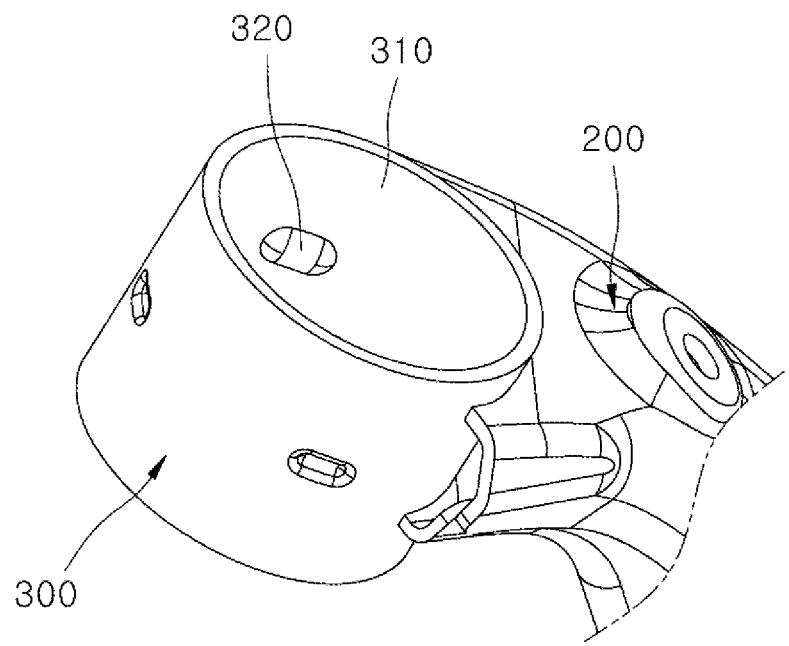
FIGS. 6A and 6B are views, each illustrating a mounting pipe of the vehicular torsion beam axle according to the embodiment of the present disclosure, and a portion, to which the mounting pipe is connected, of a trailing arm.
Figure 6B:
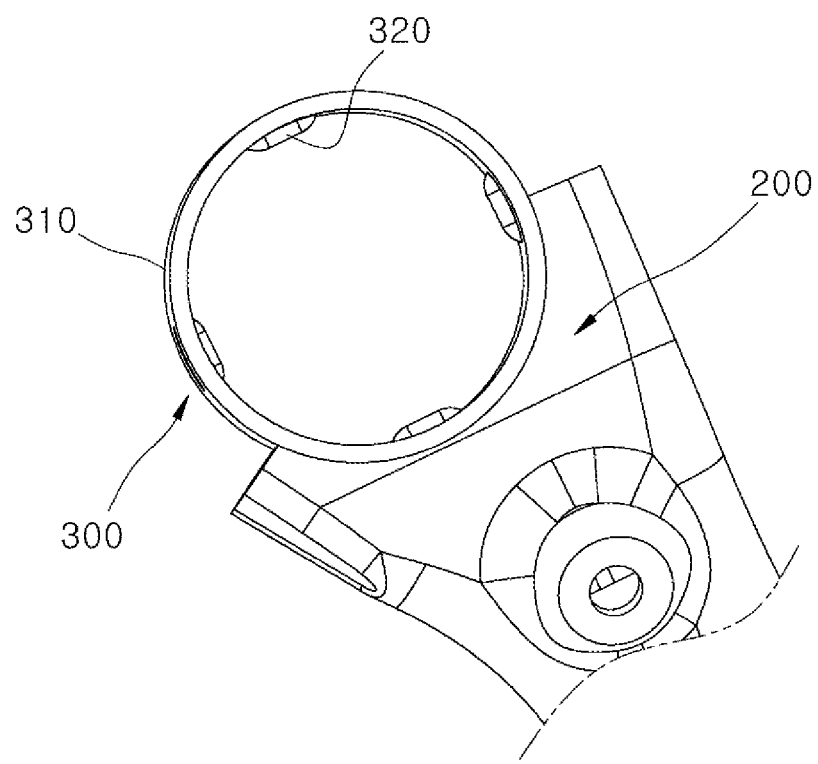
Figure 7:
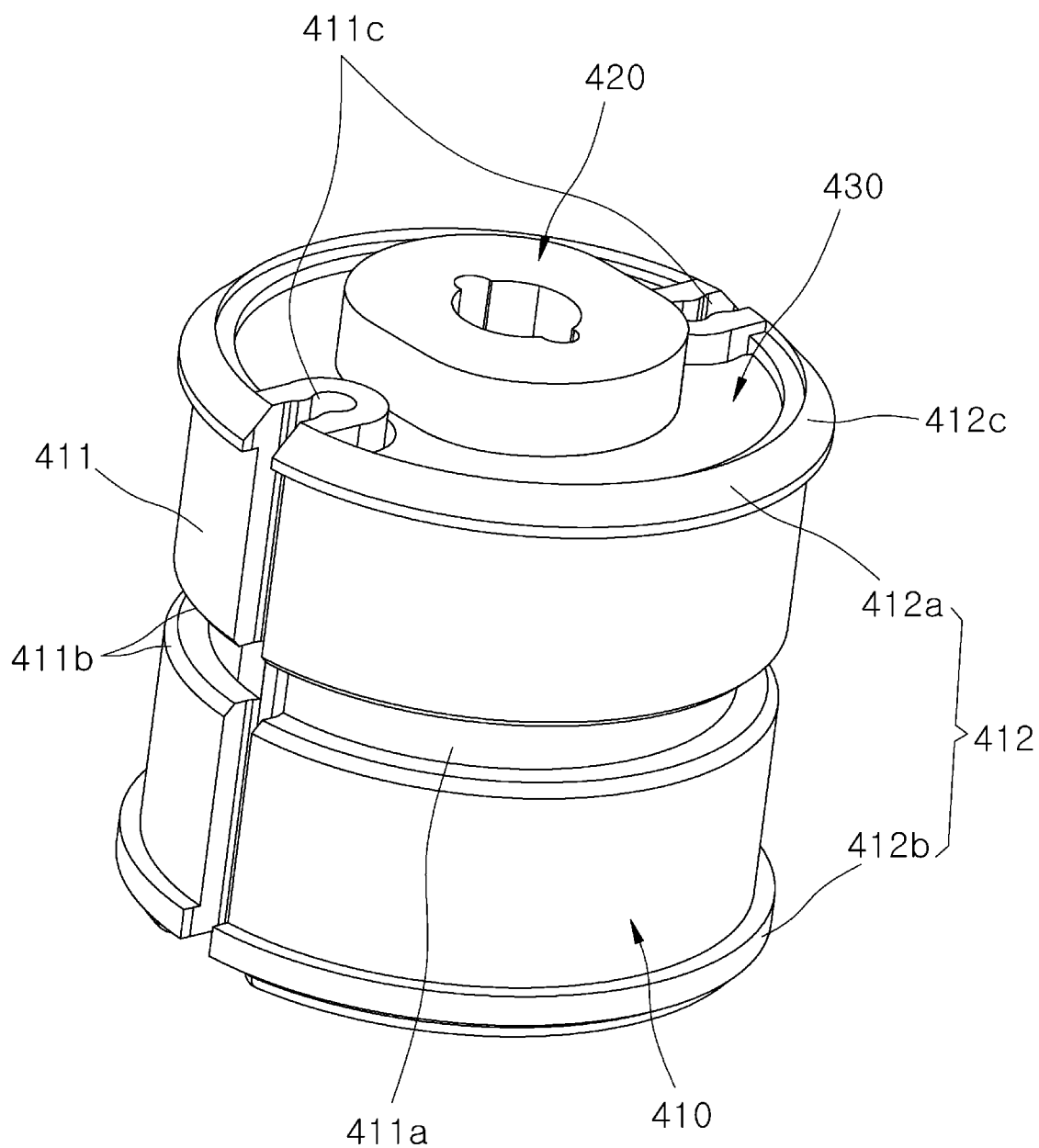
FIG. 7 is a bushing of the vehicular torsion beam axle according to the embodiment of the present disclosure.
Figure 8:
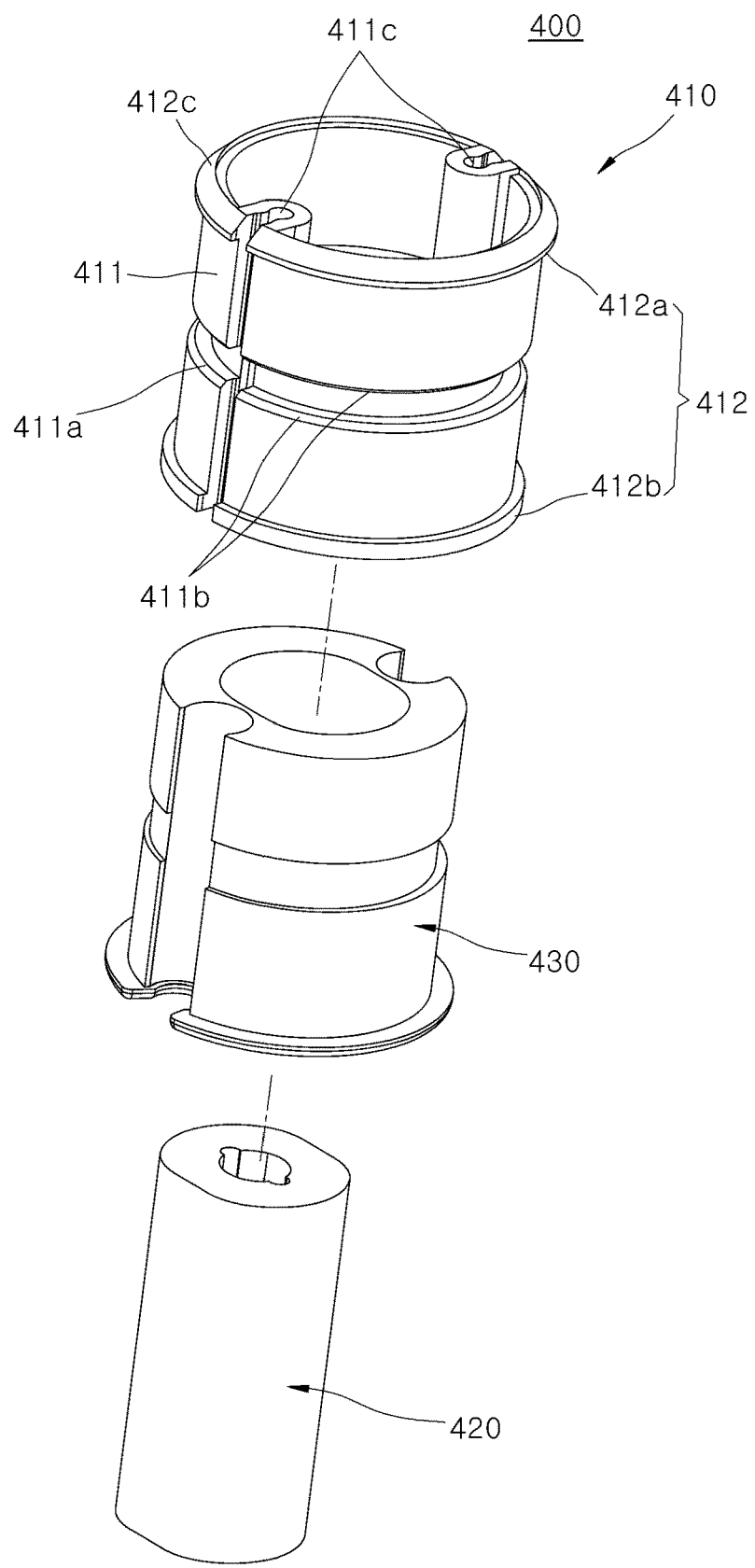
FIG. 8 is an exploded perspective view illustrating the bushing of the vehicular torsion beam axle according to the embodiment of the present disclosure.
Figure 9:
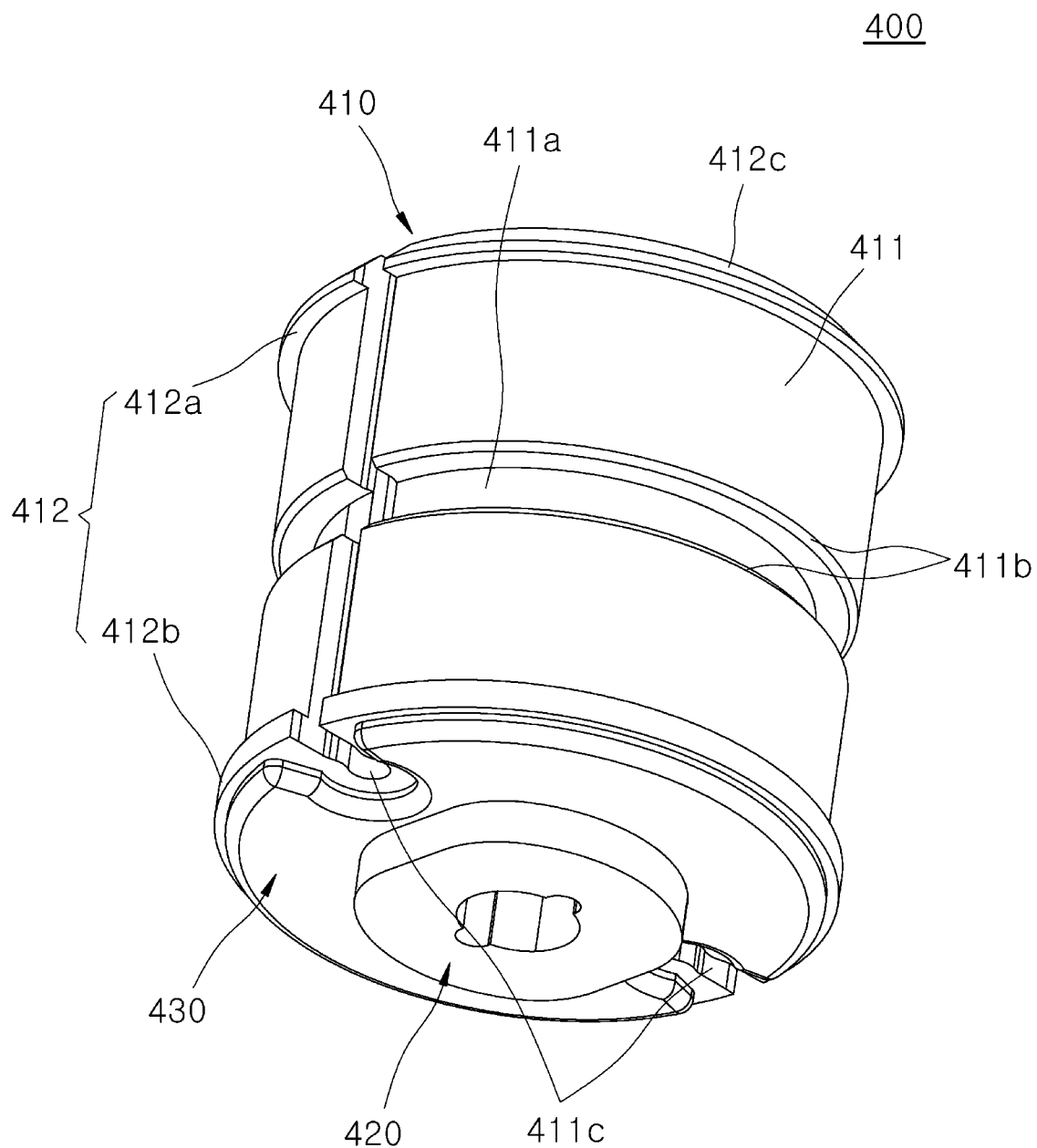
FIG. 9 is a perspective view illustrating the bushing of the vehicular torsion beam axle according to the embodiment of the present disclosure, when viewed from a different direction than in FIG. 7.
Figure 10:
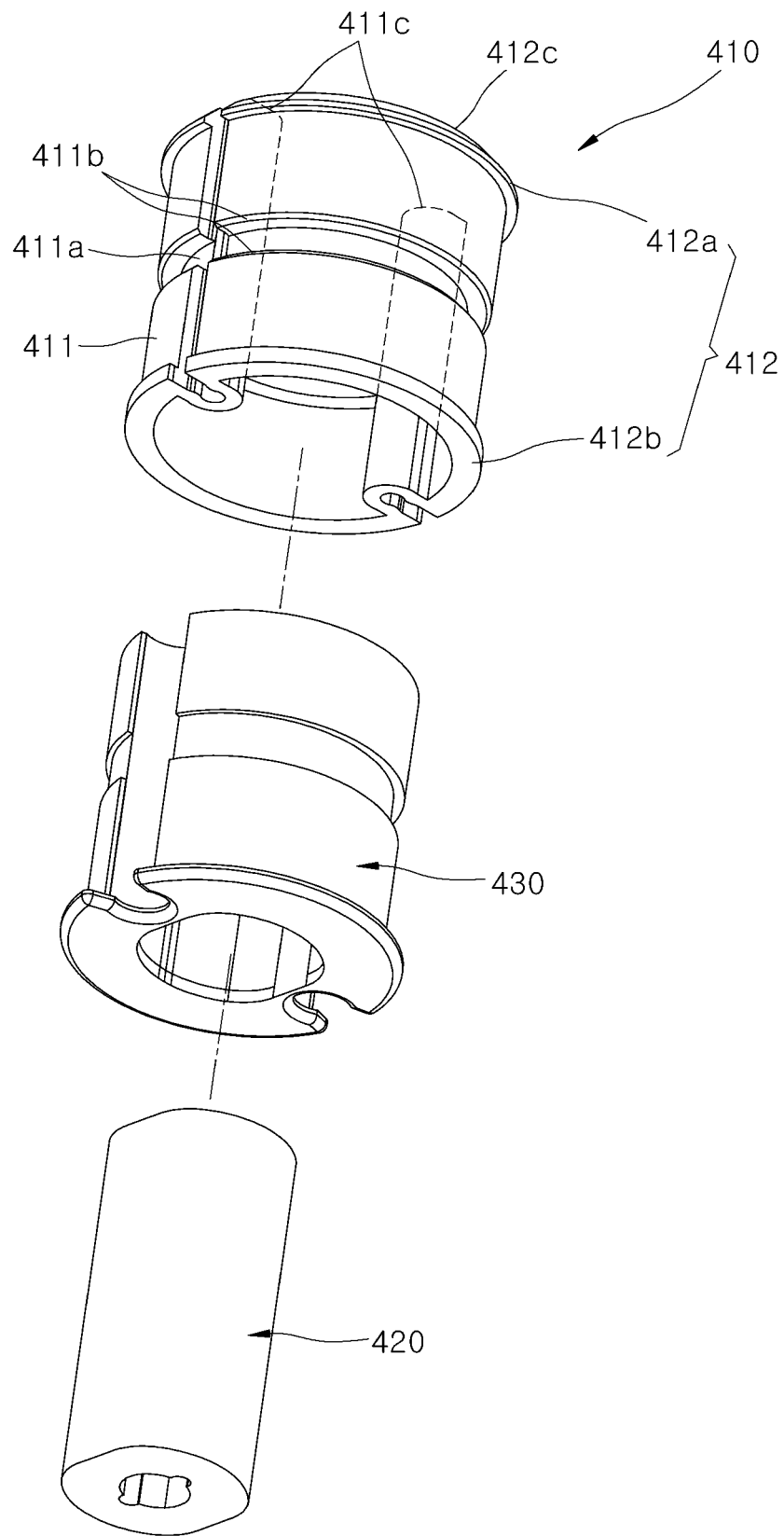
FIG. 10 is an exploded perspective view illustrating the bushing of the vehicular torsion beam axle according to the embodiment of the present disclosure, when viewed from a different direction than in FIG. 7.
Figure 11:
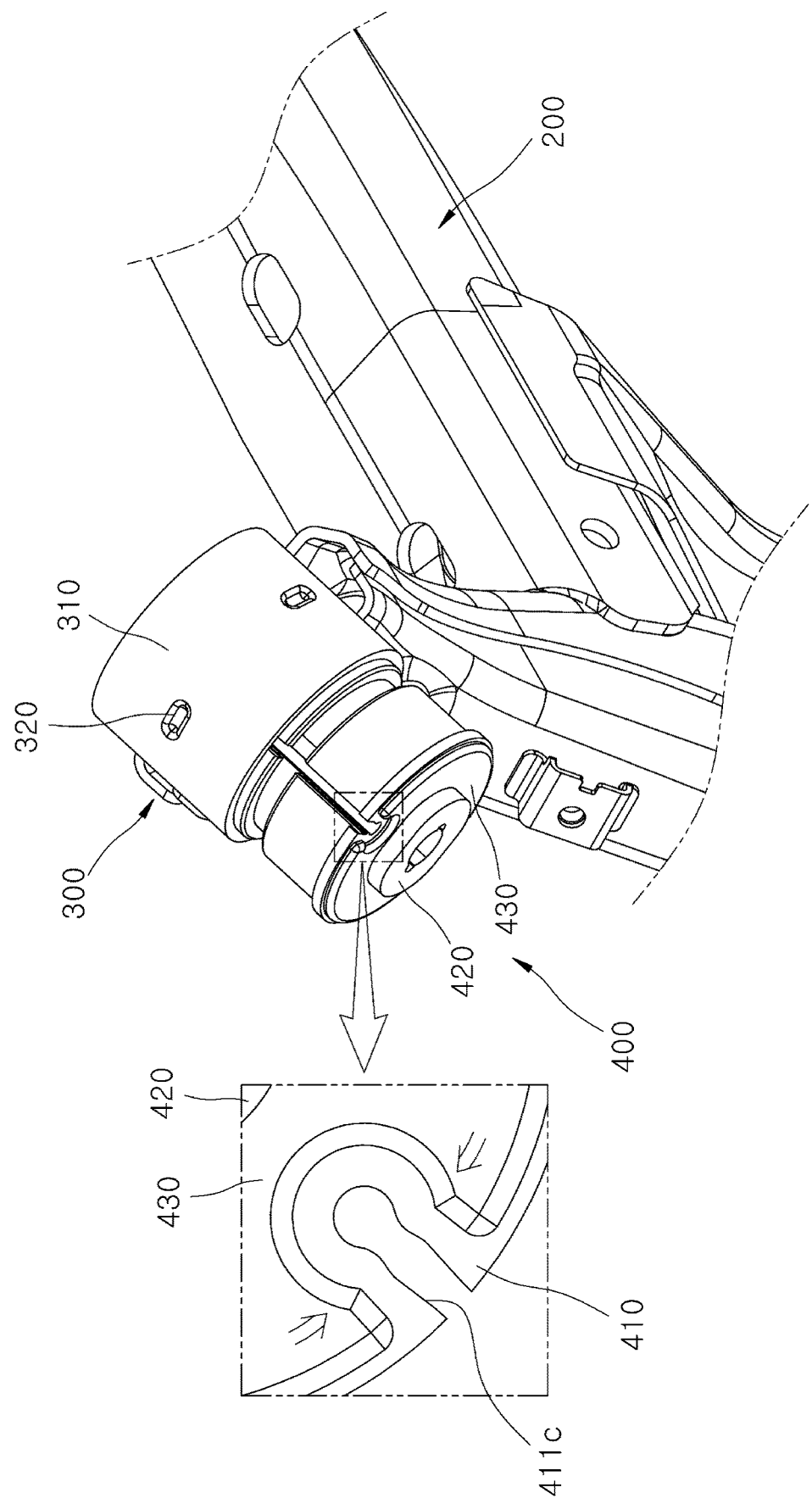
FIG. 11 is a view illustrating that the bushing is press-inserted into the mounting pipe of the vehicular torsion beam axle according to the embodiment of the present disclosure.
Figure 12:
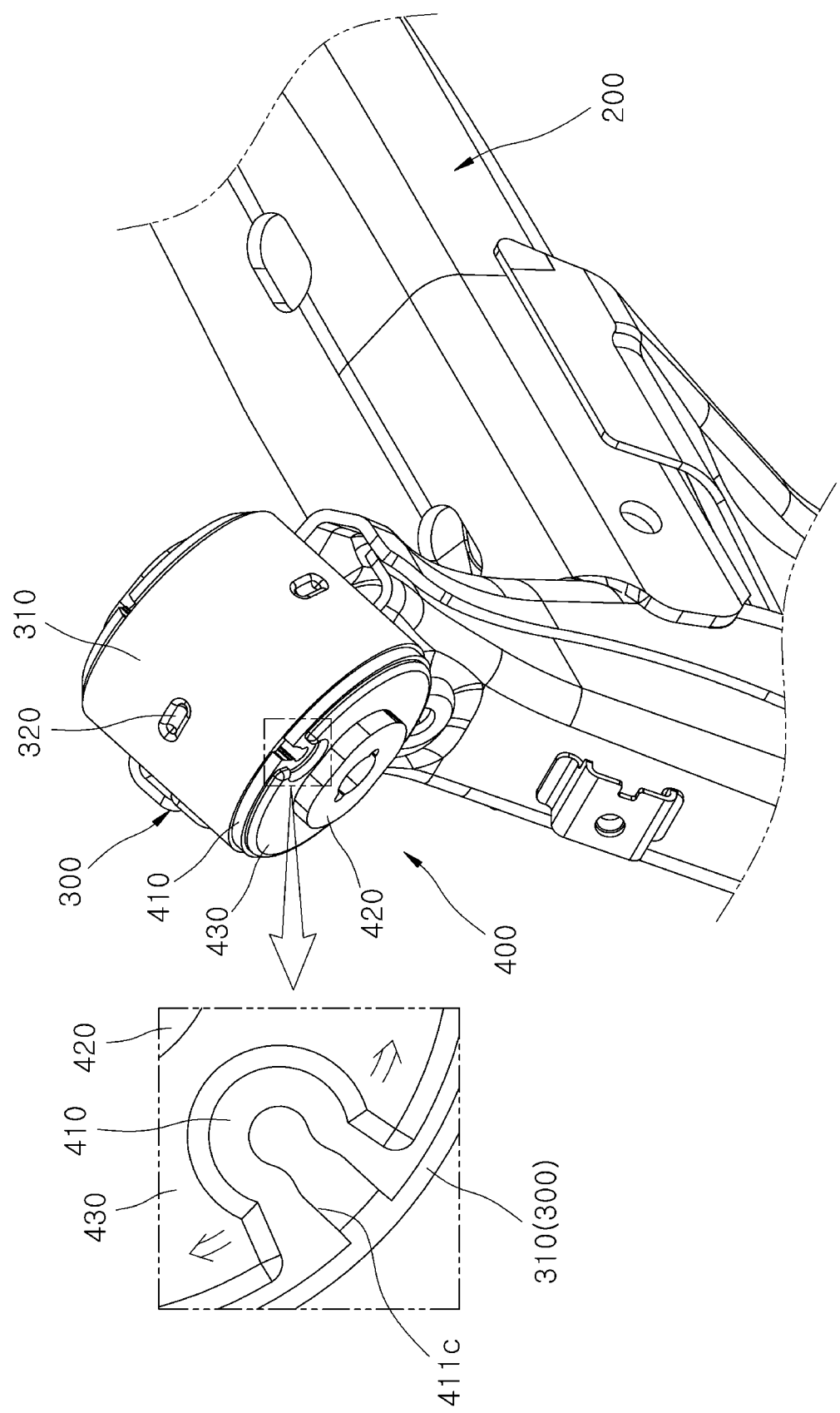
FIG. 12 is a view illustrating a state where the bushing is press-inserted into the mounting pipe of the vehicular torsion beam axle according to the embodiment of the present disclosure.

FIG. 1 is a view schematically illustrating a vehicular torsion beam axle 1 according to an embodiment of the present disclosure. FIG. 2 is a perspective view illustrating essential components of the vehicular torsion beam axle 1 according to the embodiment of the present disclosure. FIG. 3 is a top view illustrating the essential components of the vehicular torsion beam axle 1 according to the embodiment of the present disclosure in FIG. 2. FIG. 4 is a cross-sectional view taken along line A-A' on FIG. 2. FIG. 5 is an exploded perspective view illustrating the essential components of the vehicular torsion beam axle 1 according to the embodiment of the present disclosure. FIGS. 6A and 6B are views, each illustrating a mounting pipe 300 of the vehicular torsion beam axle 1 according to the embodiment of the present disclosure, and a portion, to which the mounting pipe 300 is connected, of a trailing arm 200. FIG. 7 is a bushing 400 of the vehicular torsion beam axle 1 according to the embodiment of the present disclosure. FIG. 8 is an exploded perspective view illustrating the bushing 400 of the vehicular torsion beam axle 1 according to the embodiment of the present disclosure. FIG. 9 is a perspective view illustrating the bushing 400 of the vehicular torsion beam axle 1 according to the embodiment of the present disclosure, when viewed from a different direction than in FIG. 7. FIG. 10 is an exploded perspective view illustrating the bushing 400 of the vehicular torsion beam axle 1 according to the embodiment of the present disclosure, when viewed from a different direction than in FIG. 7. FIG. 11 is a view illustrating that the bushing 400 is press-inserted into the mounting pipe 300 of the vehicular torsion beam axle 1 according to the embodiment of the present disclosure. FIG. 12 is a view illustrating a state where the bushing 400 is press-inserted into the mounting pipe 300 of the vehicular torsion beam axle 1 according to the embodiment of the present disclosure.

With reference to FIGS. 1 and 12, the vehicular torsion beam axle 1 according to the embodiment of the present disclosure includes a torsion beam 100, a pair of the trailing arms 200, the mounting pipe 300, and the bushing 400. The torsion beam 100 is arranged in a widthwise direction of a vehicle.

A pair of the trailing arms 200 are respectively connected to both sides of the torsion beam 100. The pair of the trailing arms 200 are respectively connected in a vertical direction (that is, in a vertical direction when viewed from above FIG. 1) to both sides of the torsion beam 100.

A pair of the mounting pipes 300 are respectively connected to the pair of the trailing arms 200. Each of the mounting pipes includes a separation prevention protrusion 320. The mounting pipes 300 are integrally formed with both end portions, respectively, of the trailing arm 200.

The mounting pipe 300 may include a mounting pipe main body 310 and the separation prevention protrusion 320. An outer pipe 410, which has a cylindrical shape, is press-inserted into the mounting pipe main body 310.

The separation prevention protrusion 320 is formed in a manner that protrudes inward from an inner circumferential surface of the mounting pipe main body 310, thereby being engaged with a separation prevention groove 411a formed in the outer pipe 410 of the bushing 400 described below. A plurality of the separation prevention protrusions 320 are formed on the inner circumferential surface of the mounting pipe main body 310 in such a manner as to be spaced apart from each other. In this case, the separation prevention protrusions 320 are arranged on the inner circumferential surface of the mounting pipe main body 310 in such a manner as to be spaced a preset distance apart from each other in a circumferential direction.

The separation prevention protrusion 320 may have a rounded shape (refer to FIGS. 6A and 6B). For this reason, in a case where the separation prevention protrusion 320 is engaged with the separation prevention groove 411a, the separation prevention protrusion 320 can be readily engaged with the separation prevention groove 411a.

The bushing 400, having the separation prevention groove 411a, is press-inserted into the mounting pipe 300. The separation prevention protrusion 320 is engaged with the separation prevention groove 411a. The bushing 400 may include the outer pipe 410, an inner pipe 420, and an elastic member 430 (refer to FIGS. 7 to 10).

The outer pipe 410, in which the separation prevention groove 411a is formed, is coupled to the mounting pipe 300. The outer pipe 410 is formed to have a cylindrical shape in such a manner as to be open at the top and the bottom. The separation prevention groove 411a is formed in an outer circumferential surface of the outer pipe 410 along a circumferential direction thereof. The outer pipe 410 is formed of plastic material. Thus, when press-inserted into the mounting pipe 300, the outer pipe 410 is elastically deformable.

The outer pipe 410 may include an outer pipe main body 411 and a pair of outer pipe protrusions 412. The outer pipe main body 411 has the separation prevention groove 411a and an elastic deformation groove 411c. The separation prevention groove 411a is formed in an outer circumferential surface of the outer pipe main body 411 in a circumferential direction thereof. A plurality of the separation prevention protrusions 320 are engaged with the separation prevention groove 411a.

A first chamfer 411b is formed on the separation prevention groove 411a. The first chamfer 411b is formed on an outer edge portion of the separation prevention groove 411a (refer to FIGS. 4 and 7 to 10). Accordingly, the separation prevention protrusion 320 can be engaged with the separation prevention groove 411a.

The elastic deformation groove 411c is formed in a manner that intersects the separation prevention groove 411a. A pair of the elastic deformation grooves 411c may be formed with a preset angle therebetween. The present disclosure is not limited to the pair of the elastic deformation grooves 411c as described above. The number and positions of the elastic deformation grooves 411c are changeable, depending on a situation.

When the bushing 400 is inserted into the mounting pipe 300, the elastic deformation groove 411c elastically deforms the outer pipe 410 and the below-described elastic member 430. For this reason, the bushing 400 is readily elastically deformed, and thus smooth press-insertion thereof into the mounting pipe 300 can be facilitated.

Specifically, the bushing 400 has a greater diameter than the mounting pipe 300. When the bushing 400 is inserted into the mounting pipe 300, the outer pipe 410 and the elastic member 430 are elastically deformed, resulting in a decreased diameter of the bushing 400.

Thereafter, when the bushing 400 is inserted into the mounting pipe 300, elastic restoring forces of the outer pipe 410 and the elastic member 430 restore the bushing 400 to an original state thereof. This can bring the bushing 400 into close contact with the mounting pipe 300. That is, the bushing 400 can be press-inserted into the mounting pipe 300 (refer to FIGS. 11 and 12).

A pair of the outer pipe protrusions 412 are respectively formed to extend outward from both ends of the outer pipe main body 411. The mounting pipe 300 is arranged between the pair of the outer pipe protrusions 412.

A second chamfer 412c is formed on at least one of the pair of the outer pipe protrusions 412. The second chamfer 412c is formed on an outer circumferential surface of the outer pipe protrusion 412 in an inclined manner (refer to FIGS. 4 and 7 to 10).

Before the bushing 400 is inserted into the mounting pipe 300, the outer pipe protrusion 412 on which the second chamfer 412c is formed is first brought into contact with the mounting pipe main body 310 of the mounting pipe 300. For this reason, the bushing 400 is elastically deformed and thus can be readily inserted into the mounting pipe main body 310 of the mounting pipe 300.

Specifically, each of the pair of the outer pipe protrusions 412 may include a first outer pipe protrusion 412a and a second outer pipe protrusion 412b.

The first outer pipe protrusion 412a is formed to extend outward from one of both ends of the outer pipe main body 411. The second outer pipe protrusion 412b is formed to extend outward from the other end of both ends of the outer pipe main body 411. In this case, the second chamfer 412c may be formed on an outer circumferential surface of the first outer pipe protrusion 412a in an inclined manner. Accordingly, the smooth press-insertion of the bushing 400 into the mounting pipe 300 can be facilitated.

The inner pipe 420 is arranged inside the outer pipe 410. The inner pipe 420, which has a cylindrical shape, is positioned in the center portion of the outer pipe 410. Like the outer pipe 410, the inner pipe 420 is open at the top and the bottom. In this case, the inner pipe 420 is arranged a predetermined distance apart from the outer pipe 410.

The elastic member 430, formed of elastic member, is positioned between the outer pipe 410 and the inner pipe 420. The elastic member 430 is brought into contact with an outer circumferential surface of the inner pipe 420 and an inner circumferential surface of the outer pipe 410, thereby buffering a shock. That is, the elastic member 430 absorbs the shock transferred to the bushing 400 and thus can enhance the feeling of riding comfort.

As described above, in the vehicular torsion beam axle 1 according to the present disclosure, the mounting pipe 300 is primarily coupled between the outer pipe protrusions 412 on the bushing 400, and the separation prevention protrusion 320 of the mounting pipe 300 is secondarily engaged with the separation prevention groove 411a in the bushing 400. Thus, during vehicle traveling, the bushing 400 can be prevented from the mounting pipe 300.

In addition, the forming of the first chamfer 411b on the separation prevention groove 411a can readily engage the separation prevention protrusion 320 with the separation prevention groove 411a.

In addition, the forming of the second chamfer 412c on at least one of both ends of the outer pipe 410 can facilitate smooth insertion of the bushing 400 into the mounting pipe 300.

The embodiment of the present disclosure is described only in an exemplary manner with reference to the drawings. It would be understandable to a person of ordinary skill in the art to which the present disclosure pertains that various modifications may possibly be made to the embodiment and that various equivalents thereof may possibly be implemented.

Therefore, the legitimate technical scope of the present disclosure should be defined by the following claims.

What is claimed is:

1. A vehicular torsion beam axle comprising:
    a torsion beam;
    a pair of trailing arms connected to both ends, respectively, of the torsion beam;
    a pair of mounting pipes, each including at least one separation prevention protrusion, the pair of mounting pipes being respectively connected to the pair of trailing arms; and
    a pair of bushings press-inserted respectively into the pair of mounting pipes, each of the bushings having a separation prevention groove positioned in engagement with the at least one separation prevention protrusion of an associated mounting pipe,
    wherein each of the bushings comprises:
        an outer pipe having an outer surface in which the separation prevention groove is formed;
        an inner pipe arranged inside the outer pipe; and
        an elastic member formed of elastic material and positioned between the outer pipe and the inner pipe.

2. The vehicular torsion beam axle of claim 1, wherein each of the mounting pipes comprise:
    a mounting pipe main body into which the outer pipe of one of the bushings is press-inserted, and
    wherein the at least one separation prevention protrusion of each of the mounting pipes protrudes from an inner circumferential surface of the mounting pipe main body into engagement with the separation prevention groove of the one of the bushings press-inserted into the mounting pipe main body.

3. The vehicular torsion beam axle of claim 2, wherein the at least one separation prevention protrusion includes a plurality of the separation prevention protrusions that are spaced apart from each other in a circumferential direction on the inner circumferential surface of the mounting pipe main body.

4. The vehicular torsion beam axle of claim 3, wherein each of the separation prevention protrusions has a rounded shape.

5. The vehicular torsion beam axle of claim 3, wherein the outer pipe comprises:
    an outer pipe main body having an outer circumferential surface in which the separation prevention groove and at least one elastic deformation groove is formed the at least one elastic deformation groove intersecting the separation prevention groove, the plurality of the separation prevention protrusions being positioned in engagement with the separation prevention groove and the at least one elastic deformation groove; and a pair of outer pipe protrusions formed around each end, respectively, of the outer pipe main body, and configured to be positioned in engagement with each end, respectively of the mounting pipe into which the outer pipe main body is inserted.

6. The vehicular torsion beam axle of claim 5, wherein a first chamfer is formed on the separation prevention groove.

7. The vehicular torsion beam axle of claim 5, wherein a second chamfer is formed on at least one outer pipe protrusion of the pair of outer pipe protrusions.

8. The vehicular torsion beam axle of claim 7, wherein the second chamfer is formed on an outer circumferential surface of the at least one of the pair of outer pipe protrusions.

9. The vehicular torsion beam axle of claim 5, wherein the elastic deformation groove elastically deforms the elastic member when the bushing is inserted into the associated mounting pipe.

* * * * *